US012786358B2

(12) United States Patent
Hashimoto

(10) Patent No.: US 12,786,358 B2
(45) Date of Patent: Nov. 3, 2026

(54) LASER MARKER

(71) Applicant: SCREEN HOLDINGS CO., LTD., Kyoto (JP)

(72) Inventor: Yoshimi Hashimoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 630 days.

(21) Appl. No.: 18/362,220

(22) Filed: Jul. 31, 2023

(65) Prior Publication Data

US 2024/0106993 A1 Mar. 28, 2024

(30) Foreign Application Priority Data

Sep. 22, 2022 (JP) ................................. 2022-150850

(51) Int. Cl.
*H04N 9/31* (2006.01)

(52) U.S. Cl.
CPC ......... *H04N 9/3132* (2013.01); *H04N 9/3197* (2013.01)

(58) Field of Classification Search
CPC .............. B23K 26/082; B23K 2101/40; B23K 26/0648; B23K 26/0676; B23K 26/0738; B23K 26/0853; B23K 26/355; B23K 26/362; B23K 26/364; B23K 2103/172; B23K 2103/50; B23K 26/0006; B23K 26/032; B23K 26/048; B23K 26/0624; B23K 26/064; B23K 26/0652; B23K 26/066; B23K 26/0732; B23K 26/08; B23K 26/342; B23K 26/352; B23K 26/36; B23K 26/402; G02B 27/0927; G02B 27/0911; G02B 27/0966; G02B 13/08;
(Continued)

(56) References Cited

U.S. PATENT DOCUMENTS

2005/0169330 A1 8/2005 Mutsuko et al.
2012/0018850 A1 1/2012 Hasegawa et al.
(Continued)

FOREIGN PATENT DOCUMENTS

CN 1649109 A 8/2005
CN 102407704 A 4/2012
(Continued)

OTHER PUBLICATIONS

English translation of JP-2021165769-A (Year: 2021).*
(Continued)

*Primary Examiner* — Chris Q Liu
(74) *Attorney, Agent, or Firm* — Rimon P.C.

(57) ABSTRACT

There is provided a technique that enables efficient and uniform laser marking. A laser marker includes a laser light source, an illumination optical system, a spatial light modulator, a projection optical system, and a scanning unit. The laser light source emits laser light. The illumination optical system shapes the laser light into a line-shaped parallel beam. The spatial light modulator includes a plurality of modulation components arranged along a long-axis direction, and modulates the parallel beam into a line-shaped modulated beam using the plurality of modulation components. The projection optical system guides the modulated beam to an object. The scanning unit scans the surface of the object with the modulated beam.

3 Claims, 6 Drawing Sheets

(58) Field of Classification Search
CPC ............ G02B 19/0014; G02B 19/0019; G02B 19/0047; G02B 19/0052; G02B 19/0057; G02B 21/002; G02B 21/0032; G02B 21/0076; G02B 21/08; G02B 21/16; G02B 21/18; G02B 21/36; G02B 21/367; G02B 26/0808; G02B 26/0841; G02B 27/0905; G02B 27/0944; G02B 27/12; G02B 27/18; G02B 27/42; G02B 3/0031; G02B 3/005; G02B 3/0068; G02B 3/04; G02B 6/0008
USPC .............................. 219/121.61, 121.8, 121.7
See application file for complete search history.

(56) References Cited

U.S. PATENT DOCUMENTS

| | | | | |
|---|---|---|---|---|
| 2015/0370173 | A1 | 12/2015 | Furuya et al. | |
| 2018/0207722 | A1 | 7/2018 | Feldmann et al. | |
| 2019/0193445 | A1 | 6/2019 | Harrison et al. | |
| 2020/0247052 | A1* | 8/2020 | Payne | B23K 26/066 |
| 2020/0312716 | A1* | 10/2020 | Ohtani | B23K 26/0006 |
| 2021/0313492 | A1* | 10/2021 | Mizuno | B22F 12/40 |
| 2022/0250188 | A1* | 8/2022 | Jacob | B23K 26/064 |
| 2022/0252866 | A1* | 8/2022 | Payne | G03F 7/70291 |

FOREIGN PATENT DOCUMENTS

| | | | | | |
|---|---|---|---|---|---|
| CN | 105182542 | A | | 12/2015 | |
| CN | 107921536 | A | | 4/2018 | |
| CN | 110385521 | A | | 10/2019 | |
| CN | 111247622 | A | | 6/2020 | |
| CN | 113492218 | A | | 10/2021 | |
| JP | 2012-24812 | A | | 2/2012 | |
| JP | 2019-521855 | A | | 8/2019 | |
| JP | 2021165769 | A | * | 10/2021 | H10H 20/855 |

OTHER PUBLICATIONS

Office Action dated Feb. 17, 2026, issued in corresponding Japanese Patent Application No. JP 2022-150850.
Extended European Search Report dated Mar. 1, 2024 of the corresponding European Patent Application No. 23187786.1.
Office Action dated Apr. 14, 2026, issued in corresponding Chinese Patent Application 202311219253.3.

* cited by examiner

LASER MARKER

RELATED APPLICATIONS

This application claims the benefit of Japanese Application No. 2022-150850, filed on Sep. 22, 2022, the disclosure of which is incorporated by reference herein.

BACKGROUND OF THE INVENTION

Field of the Invention

The subject matter disclosed in the present specification relates to a laser marker.

Description of the Background Art

As a method of laser marking, color laser marking performed on stainless steel or titanium metal using a pulsed laser is known. This laser marking is a technique in which an amount of energy for laser radiation is controlled using a nano-second pulsed laser, to change the film thickness of an oxide film so that any desired interference color is produced. Further, a technique is also known in which not only an oxide film but also a structure on the order of micrometers and a fine particle or a fine structure on the order of nanometers are formed by radiation to metal such as copper or titanium using a femto-second laser, to perform coloring. In this technique, scattering or absorption depending on the wavelength of light is caused by a fine structure, to change the reflectivity of a metal surface, and thus a predetermined color becomes visible.

Such a technique for laser marking is described in Japanese Translation of PCT International Application Publication No. 2019-521855, for example. According to Japanese Translation of PCT International Application Publication No. 2019-521855, a metal surface of an article is scanned with a single beam radiated in a shape of a spot (in a shape of a dot), and thus a mark is formed on the metal surface of the article.

SUMMARY OF THE INVENTION

Technical Problem

However, single-beam scanning as in the background art takes much time to draw a wide range, and hence there arises a problem of low productivity. Further, for a single beam, typically, a Gaussian beam in which energy is high at the center and is weakened toward the periphery is used. Then, to process metal using such a Gaussian beam as described would cause a difference in the degree of progress in processing between the center and the periphery of the beam. For this reason, uniform processing is difficult. One possible way to achieve uniform processing is to perform scanning in such a manner that the peripheries of single beams are superposed on each other. However, in this case, repetitive drawing is performed, and accordingly, there arises a problem of reduction in scanning efficiency.

It is an object of the present invention is to provide a technique that enables efficient and uniform laser marking.

Solution to Problem

To solve the above-described problems, the first aspect is directed to a laser marker that radiates laser light to an object including a metal surface, to form a mark, and includes: a laser light source configured to emit the laser light; an illumination optical system configured to shape the laser light into a line-shaped parallel beam; a spatial light modulator including a plurality of modulation components arranged along a long-axis direction, the spatial light modulator being configured to modulate the parallel beam into a line-shaped modulated beam using the plurality of modulation components; a projection optical system configured to guide the modulated beam to the object; and a scanning unit configured to scan the surface of the object with the modulated beam.

According to the first aspect, the object is scanned with the line-shaped modulated beam, and hence drawing can be more efficiently performed than that in a case in which scanning is performed with a spot-shaped single beam. Further, the surface of the object is scanned with the line-shaped modulated beam, and hence drawing on an area having a certain width can be achieved by one-time scanning. This enables uniform processing in the area.

Preferably, the spatial light modulator includes a planar light valve (PLV).

With this laser marker, the resistance of the spatial light modulator to power can be increased because of adoption of the PLV.

Preferably, each of the plurality of modulation components is capable of exercising multilevel control of a light amount.

With this laser marker, a light amount can be changed in multi-stages in the modulated beam. This enables marking in a plurality of colors in the modulated beam.

Preferably, when the scanning unit scans a second area adjacent to a first area that is to be scanned earlier, the scanning unit performs scanning while superposing an edge portion of the modulated beam on an edge portion of the first area.

With this laser marker, light with energy required for surface processing can be radiated to the edge portion of the first area.

Preferably, a total energy amount of the laser light radiated to the edge portion of the first area in scanning of the first area and scanning of the second area is equal to a total energy amount of light radiated to an area adjacent to the edge portion of the first area.

With this laser marker, the total energy amount of light radiated to the edge portion of the first area is equal to the total energy amount of light radiated to the adjacent area, and hence occurrence of unevenness in processing of the edge portion of the first area can be reduced.

Preferably, the edge portion of the first area has a width corresponding to at least one of the plurality of modulation components.

With this laser marker, the edge portion of the first area has a width corresponding to at least one of the plurality of modulation components, and hence an amount of light provided to the edge portion of the first area can be appropriately controlled by control of a light amount of the modulation component.

Preferably, the projection optical system is a reduction optical system configured to reduce the modulated beam.

With this laser marker, the energy density of laser light radiated to the spatial light modulator can be made lower than the energy density of laser light radiated to the object. Therefore, the surface of the spatial light modulator can be prevented from being processed. These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
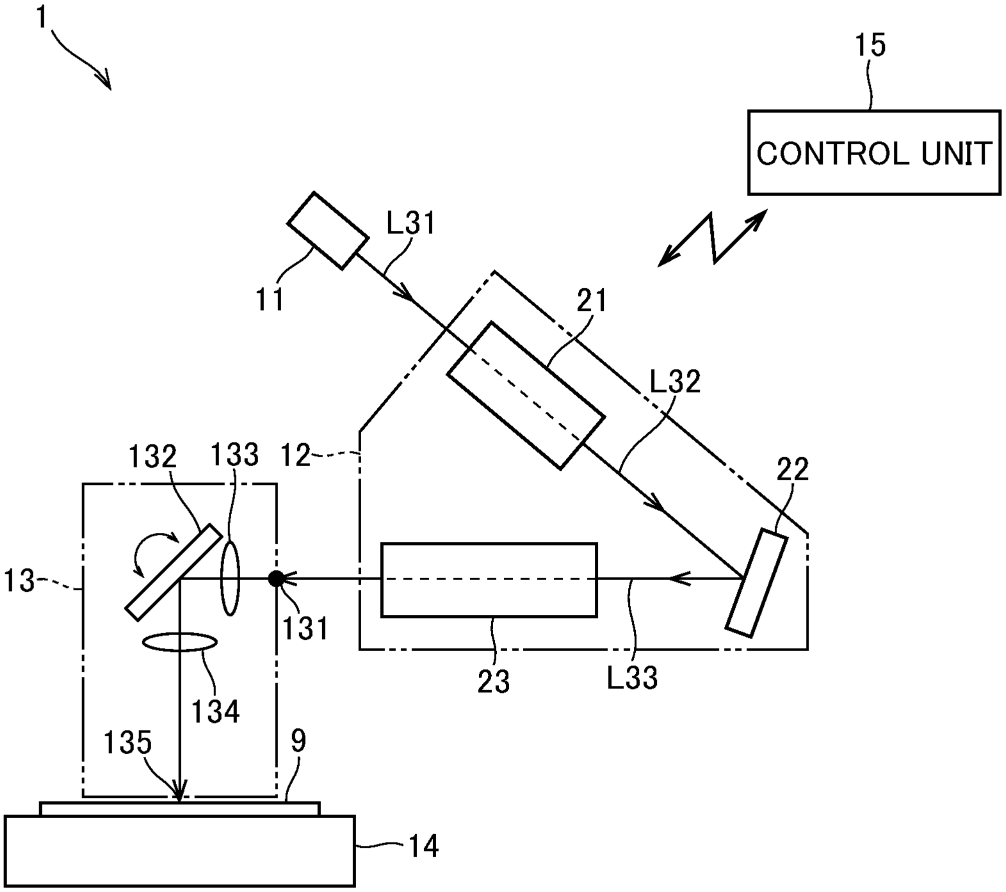
FIG. 1 is a view showing a configuration of a laser marker according to a preferred embodiment.

Hereinafter, a preferred embodiment of the present invention will be described with reference to the accompanying drawings. Note that components described in this preferred embodiment are mere examples and are not intended to limit the scope of the present invention to those. In the drawings, for the purpose of easy understanding, the dimensions or the number of respective portions are shown in an overstated or understated manner in some portions, as necessary.

FIG. 1 is a view showing a configuration of a laser marker 1 according to the preferred embodiment. The laser marker 1 is a device that forms an oxide film on a surface of an object 9 by radiating laser light to the surface of the object 9 or forms a fine structure by stripping or the like, to thereby mark the object 9 with characters or figures. The surface of the object 9 is formed of metal such as stainless steel, copper, or titanium, for example. As shown in FIG. 1, the laser marker 1 includes a laser light source 11, an optical device 12, a scanning unit 13, a holding unit 14, and a control unit 15.

The laser light source 11 emits laser light L31 to the optical device 12. The laser light source 11 is, for example, a fiber laser light source. The laser light L31 has a wavelength of 1.070 μm, for example.

The optical device 12 modulates the laser light L31 provided from the laser light source 11, into a modulated beam L33, and radiates the modulated beam L33 to the scanning unit 13. The optical device 12 includes an illumination optical system 21, a spatial light modulator 22, and a projection optical system 23. Each of the illumination optical system 21 and the projection optical system 23 includes a plurality of optical elements such as a lens, as described later.

The illumination optical system 21 shapes the laser light L31 provided from the laser light source 11 into a parallel beam L32 having substantially a shape of a line that is long along one direction (hereinafter referred to as a "long-axis direction"), and guides the parallel beam L32 to the spatial light modulator 22. In other words, the cross-sectional shape of the parallel beam L32 is substantially a shape of a line that is long along the long-axis direction and is short along a short-axis direction perpendicular to the long-axis direction. The cross-sectional shape of the parallel beam L32 is a shape of the parallel beam L32 on a plane perpendicular to the direction of travel of the parallel beam L32. In the following description, a cross section of light means a cross section of the light on a plane perpendicular to the direction of travel of the light in the same manner as described above. The cross-sectional shape of the parallel beam L32 can be regarded as a substantially rectangular shape. The cross section of the parallel beam L32 has the same size at every position along the direction of travel of the parallel beam L32. An irradiation area to be irradiated with the parallel beam L32 on the spatial light modulator 22 has substantially a shape of a line (or has a substantially rectangular shape) having a length of 28 mm along the long-axis direction and a length of 1 mm along the short-axis direction, for example.

The spatial light modulator 22 modulates the parallel beam L32 provided from the illumination optical system 21 into a modulated beam L33 and guides the modulated beam L33 to the projection optical system 23. The spatial light modulator 22 includes a planar light valve (PLV), for example. In the following description, there will be discussed a case in which the spatial light modulator 22 includes a linear planar light valve (LPLV) that is one kind of a PLV.

The LPLV, when compared to a Grating Light valve (GLV) (registered trademark) or the like, for example, has substantially equal resistance to power per unit area of an element, and has a wider effective area. That is, the LPLV can deal with higher power than a GLV as its effective area is wider.

Figure 2:
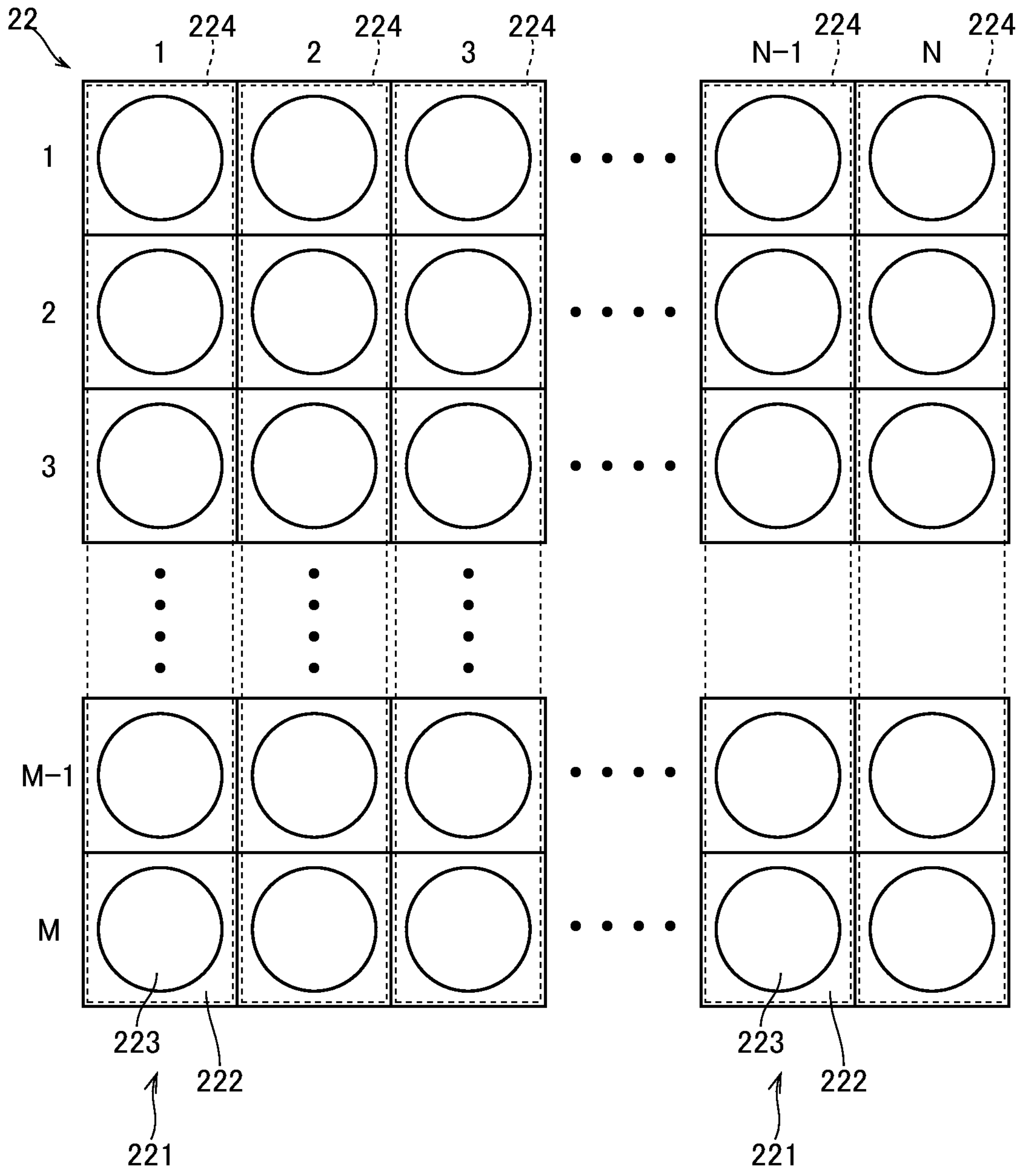
FIG. 2 is a view showing an outlined structure of a LPLV included in a spatial light modulator.

FIG. 2 is a view showing an outlined structure of the LPLV included in the spatial light modulator 22. The spatial light modulator 22 includes a plurality of substantially rectangular pixels 221. The plurality of pixels 221 are arranged adjacently to each other on a substrate not shown. The plurality of pixels 221 are arranged in a matrix of plural rows by plural columns. In other words, the plurality of pixels 221 are two-dimensionally arranged. In the spatial light modulator 22, the surfaces of the plurality of pixels 221 form a modulation surface. In the example shown in FIG. 2, M pixels 221 are arranged along a longitudinal direction in the drawing and N pixels 221 are arranged along a lateral direction. The lateral direction of FIG. 2 corresponds to the long-axis direction of the parallel beam L32 (see FIG. 1), and the longitudinal direction of FIG. 2 corresponds to the short-axis direction of the parallel beam L32.

Each of the pixels 221 is a modulation element and includes a fixed member 222 and a movable member 223. The fixed member 222 is a substantially rectangular member shaped like a flat plate fixed to the above-mentioned substrate, and has a substantially circular aperture at the center thereof. The movable member 223 is substantially circular and is positioned in the aperture of the fixed member 222. The upper surface of the fixed member 222 (i.e., the surface on the viewer side along a direction perpendicular to the drawing sheet in FIG. 2) includes a fixed reflection surface. The upper surface of the movable member 223 includes a movable reflection surface. The movable member 223 can move along a direction perpendicular to the drawing sheet in FIG. 2.

By a change in the position of the movable member 223 relative to the fixed member 222, reflected light from the pixel 221 is switched between zeroth-order light (i.e., regularly reflected light) and non-zeroth-order diffracted light. In other words, when the movable member 223 moves relative to the fixed member 222, light modulation using a diffraction grating is performed. The zeroth-order light emitted from the spatial light modulator 22 is guided to the scanning unit 13 by the projection optical system 23 (see FIG. 1). Further, the non-zeroth-order diffracted light (mainly, first-order diffracted light) emitted from the spatial light modulator 22 is guided in a direction different from the direction toward the scanning unit 13 by the projection optical system 23, and is blocked.

In the projection optical system 23, reflected light from M pixels 221 arranged in a line along the longitudinal direction in FIG. 2 (hereinafter also referred to as a "pixel column") is integrated and is radiated to the scanning unit 13 as the modulated beam L33. Thus, the power density of the modulated beam L33 radiated from the scanning unit 13 to the object 9 can be increased. In the spatial light modulator 22, M pixels 221 in one pixel column (i.e., M modulation elements) can be regarded as one modulation component 224 corresponding to one unit space. The spatial light modulator 22 functions as a light modulator including N modulation components 224 arranged in a line along the long-axis direction of the parallel beam L32 on the spatial light modulator 22.

The projection optical system 23 shown in FIG. 1 focuses the modulated beam L33 provided from the spatial light modulator 22 and guides the modulated beam L33 to the scanning unit 13. The modulated beam L33 is radiated onto an irradiation surface 135 (the surface of the object 9) through the scanning unit 13.

The scanning unit 13 reprojects a modulated image of the modulated beam L33 generated in the projection optical system 23 of the optical device 12 onto the surface of the object 9 held by the holding unit 14, and performs scanning. The scanning unit 13 is a galvano scanning system that includes a collimating lens 133, a galvano mirror 132, a galvano motor (not shown), and a scanning lens (fθ lens) 134, and is caused to project a modulated image of the modulated beam L33 onto the above-mentioned irradiation surface 135 at a specific magnification and scan the irradiation surface 135.

In the scanning unit 13, a modulated image of the modulated beam L33 is collimated and is radiated to the galvano mirror 132. The galvano mirror 132 typically includes two pairs each including a mirror and a motor, and thus can perform two-axis scanning. When the galvano mirror 132 is caused to rotate by the galvano motor, a collimated beam is reflected, so that its direction of travel is changed. The beam collimated by the scanning lens 134 is re-imaged at a position proportional to the rotation angle. As a result of this, the modulated image of the modulated beam L33 radiated onto the object 9 is scanned in a scanning direction corresponding to the short-axis direction of the modulated beam L33. After scanning a certain distance, the galvano mirror is caused to rotate and move in the long-axis direction by the dimension of the modulated image along the long-axis direction, and scanning is performed again in the short-axis direction. By repetition of the above-described operations, two-dimensional scanning on the irradiation surface 135 can be achieved. Note that the scanning unit 13 is not limited to a galvano scanner. The scanning unit 13 may be a polygon laser scanner, for example.

The holding unit 14 holds the object 9. In the present preferred embodiment, the holding unit 14 holds the plate-shaped object 9 in a horizontal posture (in which the normal to the surface of the object 9 extends along a vertical direction).

Note that the scanning unit 13 is not necessarily required to include the galvano mirror 132, and may include another structure such as a polygon laser scanner. Further, the scanning unit 13 is not limited to one that changes the direction of travel of the modulated beam L33 provided from the projection optical system 23, and may be, for example, a moving mechanism, such as a linear motor, that horizontally moves the holding unit 14 holding the object 9 with a modulated image of the modulated beam L33 being placed and fixed on the irradiation surface 135, excluding a galvano scanning system.

The control unit 15 is, for example, a computer, and includes a processor, a memory, an input/output unit, and a bus. The control unit 15 controls the laser light source 11, the optical device 12 (specifically, the spatial light modulator 22), and the scanning unit 13 on the basis of image data indicating an image to be drawn on the object 9. Thus, an image indicated by the image data is drawn on the surface of the object 9.

Figure 3:
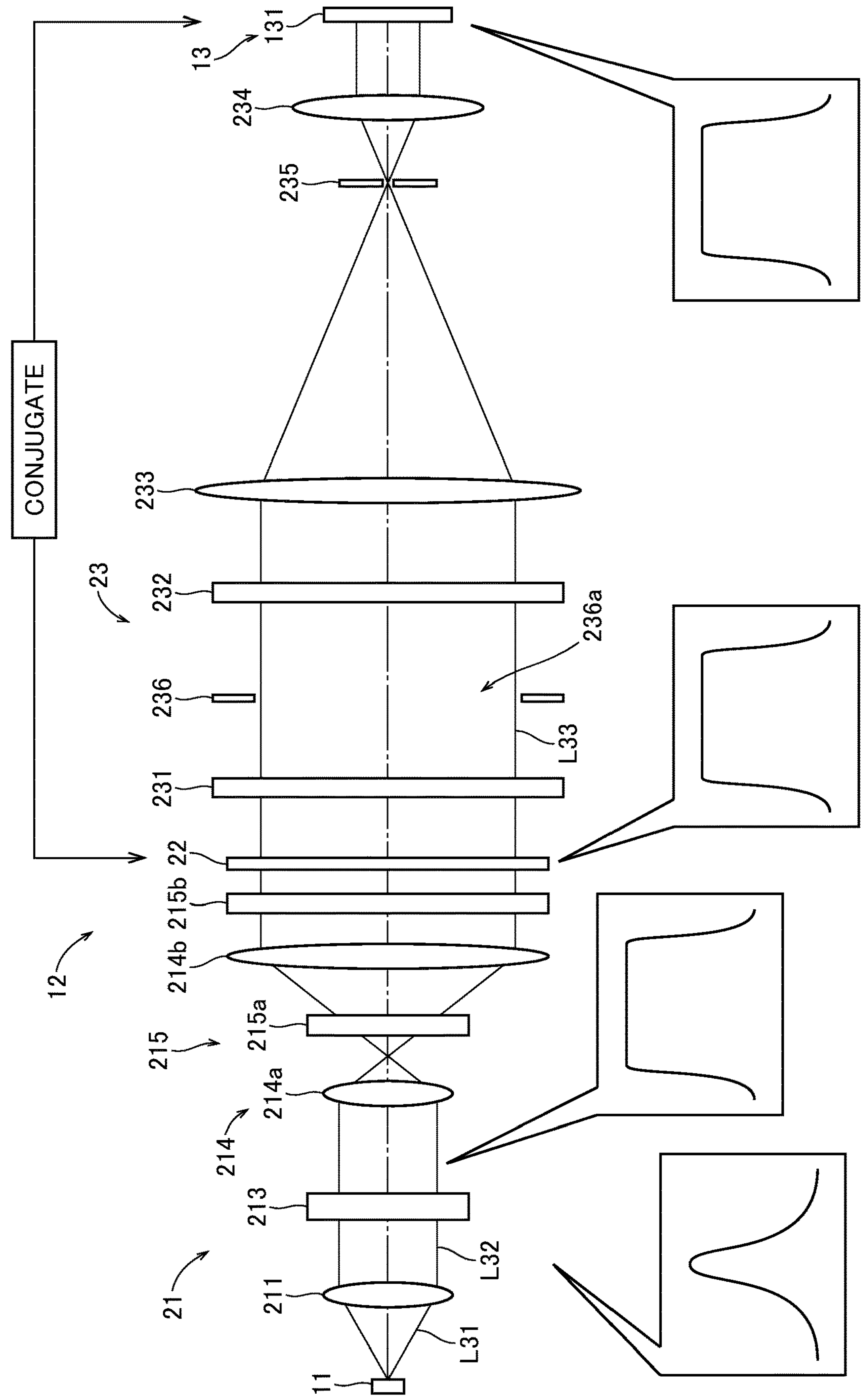
FIG. 3 is a view showing optical paths of a parallel beam and a modulated beam.
Figure 4:
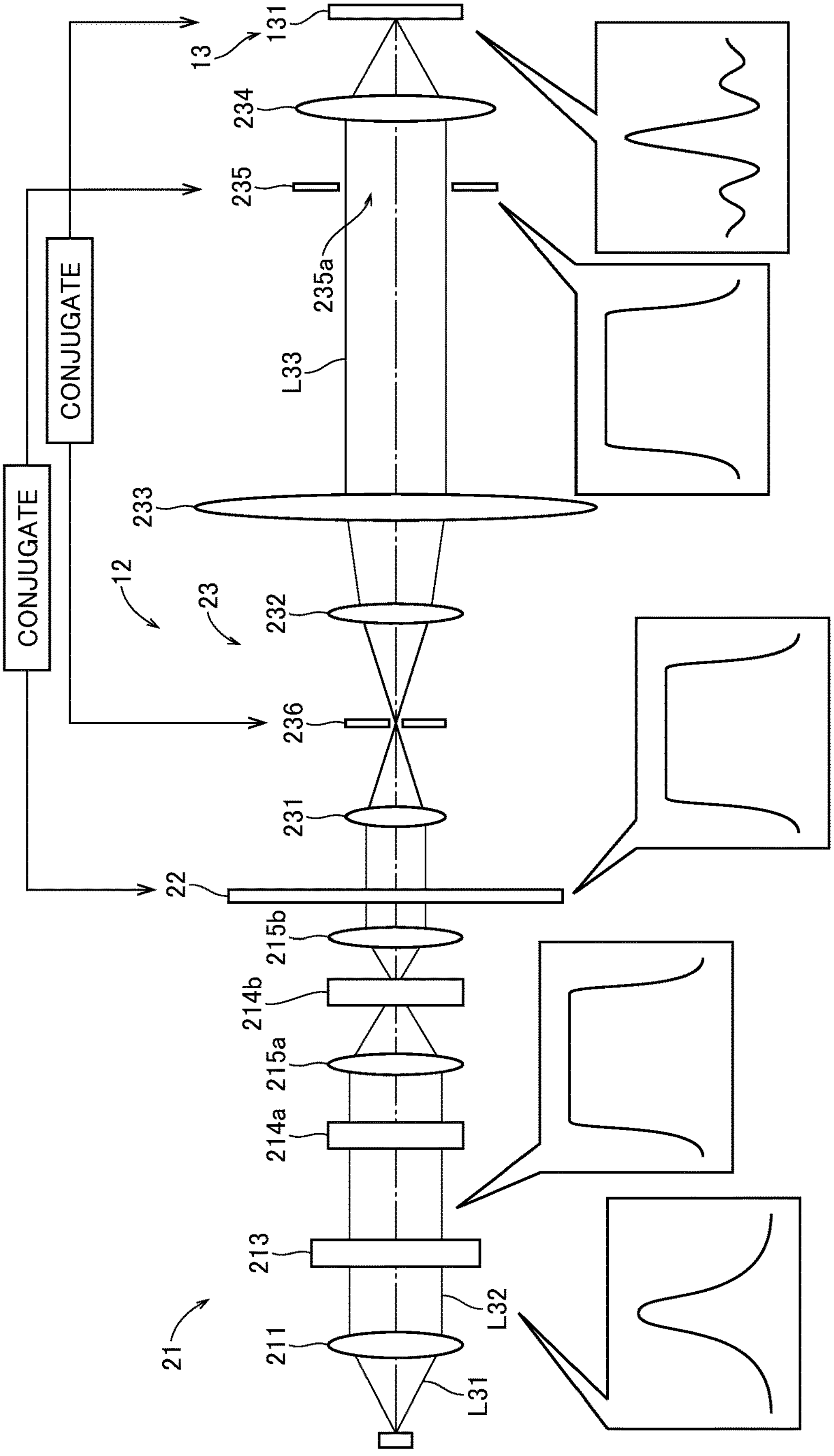
FIG. 4 is a view showing optical paths of a parallel beam and a modulated beam.

Next, particulars of the structure of the optical device 12 will be described with reference to FIGS. 3 and 4. FIG. 3 is a view showing optical paths of the parallel beam L32 and the modulated beam L33. In FIG. 3, the short-axis direction of the parallel beam L32 and the modulated beam L33 coincides with a direction perpendicular to the drawing sheet. Further, in FIG. 3, the long-axis direction of the parallel beam L32 and the modulated beam L33 coincides with a longitudinal direction in the drawing. FIG. 4 is a view showing optical paths of the parallel beam L32 and the modulated beam L33. In FIG. 4, the long-axis direction of the parallel beam L32 and the modulated beam L33 coincides with a direction perpendicular to the drawing sheet. Further, in FIG. 4, the short-axis direction of the parallel beam L32 and the modulated beam L33 coincides with a longitudinal direction in the drawing.

The illumination optical system 21 of the optical device 12 includes the collimating lens 211, a beam shaper 213, cylindrical lenses 214 and 215. The collimating lens 211, the beam shaper 213, and the cylindrical lenses 214 and 215 are arranged in this order along a direction of travel from the laser light source 11 to the spatial light modulator 22. The collimating lens 211 is a cylindrical lens, for example. Note that one collimating lens 211 is provided in the example shown in FIGS. 3 and 4, but the number of collimating lenses 211 may be two or more. Further, the collimating lens 211 is only required to generate parallel light, and the lens shape of the collimating lens 211 may be either spherical or aspherical, or may be cylindrical.

The beam shaper 213 is a top-hat beam shaper that changes distributions of light intensity in the short-axis direction and the long-axis direction in a cross section of the parallel beam L32 (hereinafter also simply referred to as an "intensity distribution") from a Gaussian distribution to a top-hat distribution in which the width of an area for the highest intensity is large (in other words, an upper portion is substantially flat).

The cylindrical lenses 214 and 215 form a rectangular image generated as a result of passage of a beam through the beam shaper 213, onto the modulation surface of the spatial light modulator 22 described later, at different magnifications for the short-axis and the long-axis, respectively. The cylindrical lens 214 includes a cylindrical lens 214*a* and a cylindrical lens 214*b* for enlarging a top-hat distribution in the long-axis direction. Further, the cylindrical lens 215 includes a cylindrical lens 215*a* and a cylindrical lens 215*b* for enlarging a top-hat distribution in the short-axis direction. In the example shown in FIGS. 3 and 4, the cylindrical lens 214*a*, the cylindrical lens 215*a*, the cylindrical lens 214*b*, and the cylindrical lens 215*b* are arranged in this order along a direction of travel of laser light directed to the spatial light modulator 22 from the laser light source 11.

Note that the illumination optical system 21 may include optical elements other than described above. Further, it is not essential that the illumination optical system 21 should include the cylindrical lenses 214 and 215. For example, the beam shaper 213 that forms a rectangular image of a desired size on the modulation surface of the spatial light modulator 22 may be used.

The illumination optical system 21 converts the laser light L31 emitted from the laser light source 11 into the parallel beam L32 and guides the parallel beam L32 to the spatial light modulator 22 as described above. Each of the respective intensity distributions in the short-axis direction and the long-axis direction in a cross section of the laser light L31 incident upon the illumination optical system 21 is a Gaussian distribution. Actually, those intensity distributions are not exact Gaussian distributions and are distributions each having a form approximate to a Gaussian function in some cases, but in the following description, an exact Gaussian distribution and a distribution approximate to a Gaussian distribution will be collectively referred to as a "Gaussian distribution".

In the illumination optical system 21, the laser light L31 emitted from the laser light source 11 passes through the collimating lens 211, to become the parallel beam L32 that is parallel light along the short-axis direction and the long-axis direction. The parallel beam L32 passes through the beam shaper 213 and the cylindrical lenses 214 and 215, and is guided to the spatial light modulator 22. Before being incident upon the beam shaper 213, the parallel beam L32 has a Gaussian distribution as its intensity distribution in the long-axis direction and also has a Gaussian distribution as its intensity distribution in the short-axis direction, as shown by distributions enclosed in rectangular frames on the lower side in the optical-path diagrams of FIGS. 3 and 4.

As a result of passage of the parallel beam L32 through the beam shaper 213, the intensity distributions of the parallel beam L32 in the short-axis direction and the long-axis direction are each changed from a Gaussian distribution to a top-hat distribution (also referred to as a rectangular distribution), as shown by the distributions enclosed in the rectangular frames on the lower side in the optical-path diagrams of FIGS. 3 and 4. Thus, each of the intensity distributions of the parallel beam L32 that passes through the beam shaper 312 and is incident upon the spatial light modulator 22 (i.e., the intensity distributions of the parallel beam L32 on the modulation surface of the spatial light modulator 22) in the short-axis direction and the long-axis direction is a top-hat distribution.

The projection optical system 23 includes a first lens 231, a second lens 232, a third lens 233, a fourth lens 234, a long-axis light blocking unit 235, and a short-axis light blocking unit 236. The first lens 231 and the second lens 232 are, for example, cylindrical convex lenses. The third lens 233 and the fourth lens 234 are, for example, spherical convex lenses. The long-axis light blocking unit 235 is, for example, a flat-plate member in which a rectangular aperture 235*a* extending in parallel with the short-axis direction is provided at the center. The short-axis light blocking unit 236 is, for example, a flat-plate member in which a rectangular aperture 236*a* extending in parallel with the long-axis direction is provided at the center. The materials of the long-axis light blocking unit 235 and the short-axis light blocking unit 236 are metal such as stainless steel, ceramic, or the like, for example.

The second lens 232 and the third lens 233 are positioned in the direction of travel of the modulated beam L33 with respect to the first lens 231 (i.e., on a side toward which the modulated beam L33 directed to the scanning unit 13 from the spatial light modulator 22 travels). In other words, the second lens 232 and the third lens 233 are positioned on a side closer to the scanning unit 13 than the first lens 231 on the optical path of the modulated beam L33. In the example shown in FIGS. 3 and 4, the third lens 233 is positioned downstream of the second lens 232 along the direction of travel of the modulated beam L33. The third lens 233 may be positioned between the first lens 231 and the second lens 232. The fourth lens 234 is positioned downstream of the first lens 231, the second lens 232, and the third lens 233 along the direction of travel of the modulated beam L33.

In the projection optical system 23, it is preferable that a front focal-point position of the first lens 231 on a short-axis side (i.e., a focal-point position closer to the spatial light modulator 22) coincides with the modulation surface of the spatial light modulator 22. To set a distance between the spatial light modulator 22 and the first lens 231 to be equal to or smaller than a front focal length (preferably, to be smaller than the front focal length) of the first lens 231 widens a distance between respective focusing points of zeroth-order diffracted light and first-order diffracted light that are generated as a result of passage of a beam through the first lens 231. Consequently, the zeroth-order diffracted light can be easily separated from non-zeroth-order diffracted light such as first-order diffracted light. Further, a front focal-point position of the third lens 233 coincides with the modulation surface of the spatial light modulator 22. A rear focal-point position of the first lens 231 on the short-axis side (i.e., a focal-point position closer to the scanning unit 13) coincides with a front composite focal-point position of the second lens 232 and the third lens 233 on the short-axis side. A rear focal-point position of the third lens 233 coincides with a front focal-point position of the fourth lens 234. A rear focal-point position of the fourth lens 234 coincides with a projection position (hereinafter also referred to as a "projection surface") 131 of a modulated image where an entrance of the scanning unit 13 is present.

In the projection optical system 23, because of inclusion of the third lens 233 and the fourth lens 234, the modulation surface of the spatial light modulator 22 and the projection surface 131 of a modulated image in the scanning unit 13 are optically conjugate for the long-axis direction. Further, for the short-axis direction, because of inclusion of the first lens 231, the second lens 232, and the third lens 233, the modulation surface of the spatial light modulator 22 and the front focal-point position of the fourth lens 234 are optically conjugate. The fourth lens 234 focuses the modulated beam L33 onto the projection surface 131 of a modulated image in the scanning unit 13 along the short-axis direction. Because of inclusion of the second lens 232, the third lens 233, and the fourth lens 234, the projection surface 131 of a modulated image in the scanning unit 13 and the rear focal-point position of the first lens 231 are optically conjugate for the short-axis direction.

In the example shown in FIGS. 3 and 4, the first lens 231, the short-axis light blocking unit 236, the second lens 232, the third lens 233, the long-axis light blocking unit 235, and the fourth lens 234 are arranged in this order along a direction of travel from the spatial light modulator 22 to the scanning unit 13. The short-axis light blocking unit 236 is positioned between the first lens 231 and the second lens 232. Note that, in a case in which the third lens 233 is placed between the first lens 231 and the second lens 232, the short-axis light blocking unit 236 is positioned between the first lens 231 and the third lens 233. That is, the short-axis light blocking unit 236 is placed near the focusing point of the modulated beam L33 along the short-axis direction between the first lens 231 and each of the second lens 232 and the third lens 233. The short-axis light blocking unit 236 is placed at the rear focal-point position of the first lens 231 on the short-axis side, for example. Further, the long-axis light blocking unit 235 is placed near the focusing point of the modulated beam L33 along the long-axis direction between the third lens 233 and the fourth lens 234. The long-axis light blocking unit 235 is placed at the rear focal-point position of the third lens 233, for example.

Note that, in the projection optical system 23, the kinds of the first lens 231, the second lens 232, the third lens 233, and the fourth lens 234 may be variously changed, and optical elements other than those lenses may be added. Further, the materials, shapes, and structures of the long-axis light blocking unit 235 and the short-axis light blocking unit 236 may be variously changed.

As described above, the projection optical system 23 guides the modulated beam L33 provided from the spatial light modulator 22, to the scanning unit 13. Specifically, the modulated beam L33 that is parallel light generated in the spatial light modulator 22 passes through the first lens 231, to thereby be focused onto the rear focal-point position of the first lens 231 (i.e., the front composite focal-point position of the second lens 232 and the third lens 233) along the short-axis direction. The modulated beam L33 is not refracted during passage through the first lens 231 along the long-axis direction.

The modulated beam L33 having passed through the first lens 231 passes through the aperture 236*a* of the short-axis light blocking unit 236 positioned at the rear focal-point position of the first lens 231 on the short-axis side. Specifically, in reflected light reflected from the spatial light modulator 22, zeroth-order light and non-zeroth-order diffracted light on a long-axis side (in the long-axis direction with respect to the zeroth-order light) pass through the rectangular aperture 236*a* of the short-axis light blocking unit 236, and non-zeroth-order diffracted light (mainly, first-order diffracted light (i.e., +1st-order diffracted light and −1st-order diffracted light)) on a short-axis side (in the short-axis direction with respect to the zeroth-order light) is blocked by the short-axis light blocking unit 236. The non-zeroth-order diffracted light on the short-axis side is radiated to the irradiation area having substantially a shape of a line extending along the long-axis direction across portions on the upper and lower sides of the aperture 236*a* of the short-axis light blocking unit 236 (i.e., on opposite sides of the aperture 236*a* along the short-axis direction).

The cross section of the modulated beam L33 having passed through the aperture 236*a* of the short-axis light blocking unit 26 becomes wider along the short-axis direction as the beam travels in the direction of travel. The modulated beam L33 having passed through the short-axis light blocking unit 236 passes through the second lens 232 and the third lens 233, to thereby become parallel light along the short-axis direction. The modulated beam L33 is not refracted during passage through the second lens 232 along the long-axis direction, and passes through the third lens 233, to thereby be focused onto the rear focal-point position of the third lens 233 (i.e., the front focal-point position of the fourth lens 234).

The modulated beam L33 having passed through the second lens 232 and the third lens 233 passes through the aperture 235*a* of the long-axis light blocking unit 235 positioned at the rear focal-point position of the third lens 233. Specifically, in reflected light reflected from the spatial light modulator 22, zeroth-order light passes through the rectangular aperture 235*a* of the long-axis light blocking unit 235, and non-zeroth-order diffracted light (mainly, first-order diffracted light) on the long-axis side is blocked by the long-axis light blocking unit 235. The non-zeroth-order diffracted light on the long-axis side is radiated to the irradiation area having substantially a shape of a line extending along the short-axis direction across portions on the right and left sides of the aperture 235*a* of the long-axis light blocking unit 235 in the drawing (i.e., on opposite sides of the aperture 235*a* along the long-axis direction).

The cross section of the modulated beam L33 having passed through the aperture 235*a* of the long-axis light blocking unit 235 becomes wider along the long-axis direction as the beam travels in the direction of travel. The modulated beam L33 having passed through the long-axis light blocking unit 235 passes through the fourth lens 234, to thereby become parallel light along the long-axis direction, and then is incident upon the projection surface 131 of a modulated image in the scanning unit 13. Further, the modulated beam L33 incident upon the fourth lens 234 as parallel light along the short-axis direction passes through the fourth lens 234, to thereby be focused onto the projection surface 131 of a modulated image positioned at the rear focal-point position of the fourth lens 234 in the scanning unit 13, along the short-axis direction.

As described above, for the long-axis direction, the modulation surface of the spatial light modulator 22 and the projection surface 131 of a modulated image in the scanning unit 13 are optically conjugate. Further, the intensity distribution of the parallel beam L32 in the long-axis direction on the modulation surface of the spatial light modulator 22 is a top-hat distribution as shown in the rectangular frame in FIG. 3. Consequently, also the intensity distribution of the modulated beam L33 in the long-axis direction on the projection surface 131 of a modulated image in the scanning unit 13 is a top-hat distribution.

Further, for the short-axis direction, the modulation surface of the spatial light modulator 22 and the front focal-point position of the fourth lens 234 (i.e., the rear focal-point position of the third lens 233) are optically conjugate. Moreover, the intensity distribution of the parallel beam L32 in the short-axis direction on the modulation surface of the spatial light modulator 22 is changed to a top-hat distribution by the beam shaper 213 as shown in a rectangular frame in FIG. 4. Thus, the intensity distribution of the modulated beam L33 having passed through the third lens 233, in the short-axis direction, is a top-hat distribution at the front focal-point position of the fourth lens 234. Consequently, due to a Fourier transform performed by the fourth lens 234, the intensity distribution of the modulated beam L33 in the short-axis direction at a focusing point on the projection surface 131 of a modulated image in the scanning unit 13 is a sinc distribution. Actually, the intensity distribution of the modulated beam L33 in the short-axis direction is not an exact sinc distribution and is a distribution having a form approximate to a sinc function in some cases, but in the following description, an exact sinc distribution and a distribution approximate to a sine distribution will be collectively referred to as a "sinc distribution". A sine distribution, like a Gaussian distribution, is a distribution having a definite peak, and hence the modulated beam L33 can be appropriately focused onto the projection surface 131 of a modulated image in the scanning unit 13.

The size of the modulated beam L33 on the projection surface 131 of a modulated image in the scanning unit 13 is calculated as follows. For example, suppose that the laser light L31 has a wavelength λ of 1.070 μm, and the irradiation area on the modulation surface of the spatial light modulator 22 has substantially a shape of a line (or has a substantially rectangular shape) with a length $L_1$ of 28 mm along the long-axis direction and a length $L_2$ of 1 mm along the short-axis direction. Further, suppose that the focal lengths $f_1$ and $f_2$ of the first lens 231 and the second lens 232 on the short-axis side are 40 mm and 400 mm, respectively, and the focal lengths $f_3$ and $f_4$ of the third lens 233 and the fourth lens 234 are 240 mm and 60 mm, respectively. Moreover, suppose that a distance d between the second lens 232 and the third lens 233 is 50 mm. In this case, the composite focal length $f_{23}$ of the second lens 232 and the third lens 233 on the short-axis side is about 163 mm.

As described above, the modulated beam L33 is focused onto the rear focal-point position of the first lens 231 along the short-axis direction. A focusing diameter (i.e., a dark-ring diameter of a sine function) psi of the modulated beam L33 at the rear focal-point position of the first lens 231, along the short-axis direction, is 104 μm ($\approx 2.44\times\lambda\times f_1'/L_2$). The rear focal-point position of the first lens 231 is optically conjugate to the projection surface 131 of a modulated image in the scanning unit 13 for the short-axis direction. Consequently, the focusing diameter of the modulated beam L33 on the projection surface 131 of a modulated image, along the short-axis direction, is 33 μm ($\approx$104 μm$\times f_4/f_{23}$).

As described above, the modulated beam L33 is focused onto the rear focal-point position of the third lens 233 along the long-axis direction. A focusing diameter $\phi_{L3}$ of the modulated beam L33 at the rear focal-point position of the third lens 233, along the long-axis direction, is 22 μm ($\approx 2.44\times\lambda\times f_3/L_1$). Additionally, the length $L_3$ of the modulated beam L33 at the rear focal-point position of the third lens 233, along the long-axis direction, is 4 mm ($=L_2\times f_{23}\times f_1$). The modulation surface of the spatial light modulator 22 and the projection surface 131 of a modulated image in the scanning unit 13 are optically conjugate for the long-axis direction. Consequently, the length of the modulated beam L33 on the projection surface 131 of the modulated image, along the long-axis direction, is 7 mm ($=L_1\times f_1\times f_3$)

As described above, the short-axis light blocking unit 236 is placed at the rear focal-point position of the first lens 231. Hence, the irradiation area for first-order diffracted light (i.e., +1st-order diffracted light and −1st-order diffracted light) radiated to the opposite sides of the aperture 236*a* of the short-axis light blocking unit 236 along the short-axis direction has substantially a shape of a line with a length of 28 mm ($=L_1$) along the long-axis direction and a length of 104 μm ($\approx\phi_{S1}$) along the short-axis direction. Further, the long-axis light blocking unit 235 is placed at the rear focal-point position of the third lens 233. Hence, the irradiation area for first-order diffracted light radiated to the opposite sides of the aperture 235*a* of the long-axis light blocking unit 235 along the long-axis direction has a shape of a line with a length of 22 μm ($\approx\phi L_3$) along the long-axis direction and a length of 4 mm ($=L_3$) along the short-axis direction.

Suppose that there is an optical device in which the modulated beam L33 is focused onto the same position on an optical path by a single convex lens (i.e., a rear focal-point position of the convex lens) along both of a long-axis direction and a short-axis direction (such an optical device will be referred to as an "optical device of a comparative example). In the optical device of the comparative example, first-order diffracted light is radiated to a dot-shaped irradiation area on a light blocking unit placed at the rear focal-point position. For example, in a case in which the convex lens has a focal length of 240 mm, the irradiation area for the first-order diffracted light on the light blocking unit has a diameter of about 326 μm. Thus, the optical device 12 according to the present preferred embodiment reduces the power density of first-order diffracted light on the short-axis light blocking unit 236 and the power density of first-order diffracted light on the long-axis light blocking unit 235 to 1/10 or lower, as compared to the optical device of the comparative example.

In the laser marker 1, the scanning unit 13 scans the surface of the object 9 with a re-projected image of the modulated beam L33. Assuming that the collimating lens 133 and the scanning lens 134 have the same focal length, an image having a length of 33 μm along the short-axis direction and a length of 7 mm along the long-axis direction is to be scanned. The control unit 15 controls the amount of reflected light of the modulated beam L33 guided to the irradiation surface 135 in accordance with image data for each of the modulation components 224 of the spatial light modulator 22. In this manner, the modulated beam L33 of which light amount is varied along the long-axis direction is radiated to the object 9. Then, oxide films having different thicknesses depending on each light amount or fine structures depending on each light amount are formed on the surface of the object 9. Consequently, an image expressed in a plurality of colors is drawn on the surface of the object 9.

The beam shaper 213 shapes each of the intensity distributions of the laser light L31 in the short-axis direction and the long-axis direction into a top-hat distribution, which makes it possible to increase a total amount of provided light while reducing the maximum power density of the parallel beam L32 incident upon the spatial light modulator 22. This enables an increase in the total amount of light provided to the spatial light modulator 22 while reducing a risk of damage to the spatial light modulator 22. Further, with the above-described configuration of the projection optical system 23, the parallel beam L32 that is incident upon the spatial light modulator 22 with top-hat distributions (in the short-axis direction and the long-axis direction) can be appropriately focused onto the object 9 as the modulated beam L33 with a sinc distribution (in the short-axis direction) having a definite peak. As a result of this, the power density of the modulated beam L33 radiated to the object 9 can be appropriately increased.

In the projection optical system 23, it is preferable that the third lens 233 is positioned in the direction of travel of the modulated beam L33 with respect to the second lens 232. In other words, it is preferable that the third lens 233 is placed between the second lens 232 and the fourth lens 234. If the second lens 232 is positioned in the direction of travel of the modulated beam L33 with respect to the third lens 233, chief rays emitted from respective positions in the spatial light modulator 22 along the long-axis direction are incident upon the second lens 232 at different angles, to possibly cause aberration. In contrast, when the third lens 233 is placed in the direction of travel of the modulated beam L33 with respect to the second lens 232 as described above, chief rays emitted from respective positions in the spatial light modulator 22 along the long-axis direction are incident upon the second lens 232 at substantially right angles, so that occurrence of aberration can be reduced.

Figure 5:
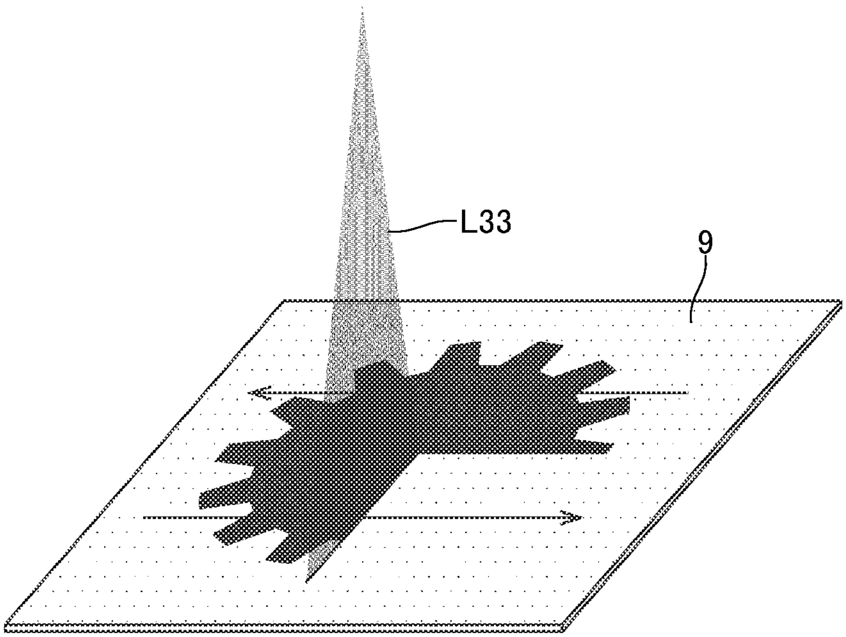
FIG. 5 is a perspective view showing a surface of an object to be canned with a line-shaped modulated beam.

FIG. 5 is a perspective view showing the surface of the object 9 to be scanned with the line-shaped modulated beam L33. With the laser marker 1, scanning is performed with the line-shaped modulated beam L33, and hence a wider range can be drawn at once than that in a case in which drawing is performed by scanning with a spot-shaped single beam. This enables efficient drawing. Therefore, the productivity can be improved.

Further, in a case in which drawing is performed by scanning with a single beam, the thicknesses of oxide films in one pixel may possibly exhibit a non-uniform distribution. In contrast thereto, in a case in which scanning is performed with the modulated beam L33, drawing on an area having a certain width can be achieved by one-time scanning. Thus, non-uniform processing in the above-mentioned area (for example, formation of oxide films having non-uniform thicknesses or formation of non-uniform fine structures) can be reduced. For example, in a case in which all of the modulated beam L33 is turned on, the object 9 can be scanned with the modulated beam L33 in which a light amount is uniform over the entire width of the modulated beam L33, and hence all portions over the entire width of the modulated beam L33 can achieve uniform processing. Further, the thickness of an oxide film or a fine structure varies depending on thermal energy (fluence) generated by laser radiation. The LPLV is an element capable of exercising multilevel control of a light amount, and hence can perform processing on the object 9 such that the surface of the object 9 is colored in a desired color by controlling a light amount. That is, the LPLV can achieve not only uniform coloring by one-time scanning, but also coloring of the surface of the object 9 in a desired color in the modulated beam L33 by forming multilevel light-amount distributions in the modulated beam L33. In other words, marking in a plurality of colors can be performed in the modulated beam L33.

Figure 6:
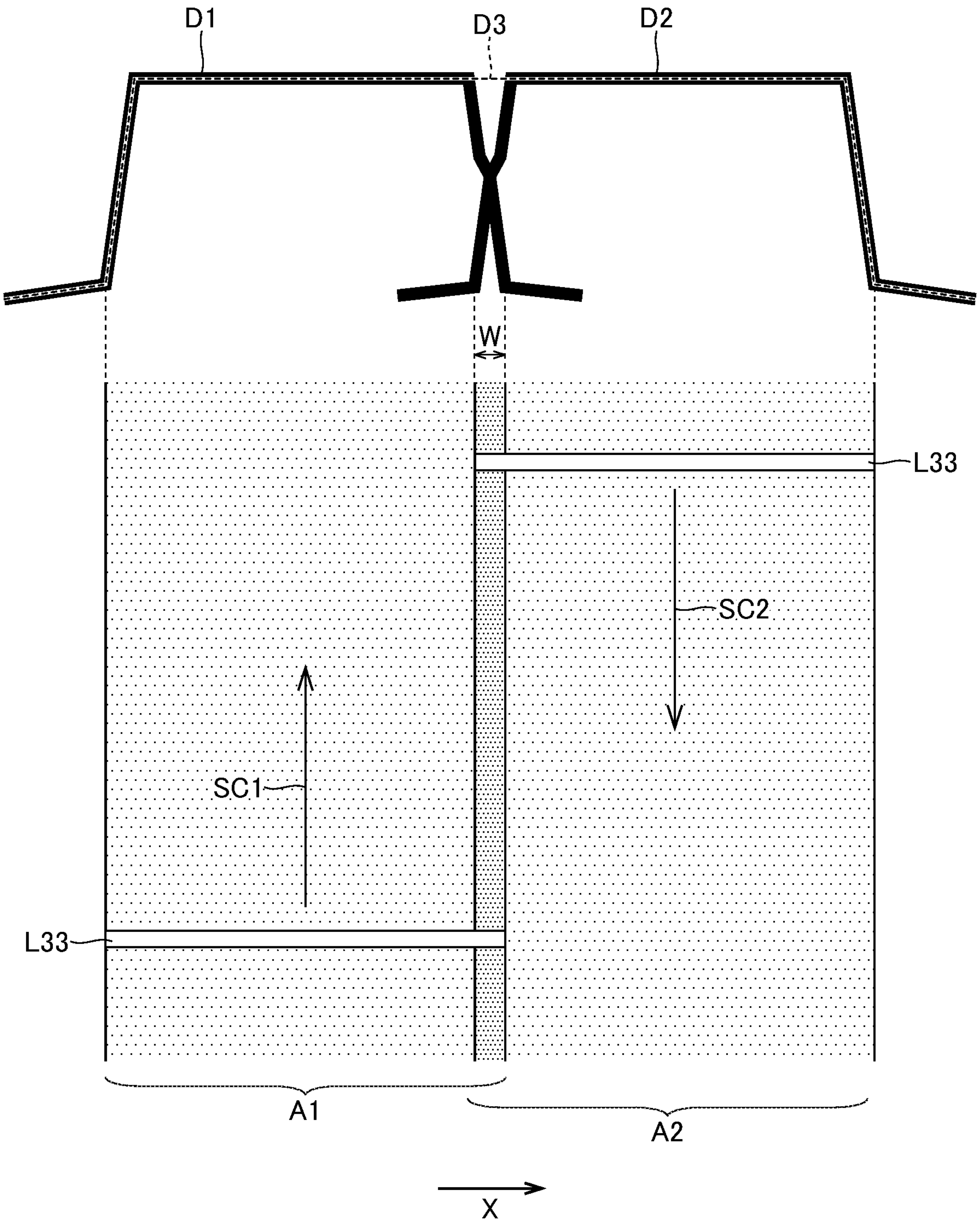
FIG. 6 is a view showing an intensity distribution of a modulated beam in a case in which adjacent areas are filled with one color.

FIG. 6 is a view showing intensity distributions D1 and D2 of the modulated beam L33 in a case in which adjacent areas are filled with one color. Note that FIG. 6 shows first scanning SC1 corresponding to the intensity distribution D1 and also second scanning SC2 corresponding to the intensity distribution D2.

For filling with one color, in a case in which the intensity distribution of a modulated image of the modulated beam L33 is the maximum intensity, the intensity distribution of the modulated image of the modulated beam L33 is a top-hat distribution. However, it is difficult to make the intensity distribution perfectly rectangular, and the intensity distribution of the edge portion of the modulated image of the modulated beam L33 along the long-axis direction is non-uniform and is lower than the maximum intensity. For this reason, only one-time scanning would leave an area insufficiently irradiated with laser light. Thus, an irradiation position for the modulated image of the modulated beam L33 is adjusted so that a border between two adjacent areas is scanned repetitively.

For example, as shown in FIG. 6, suppose that a first area A1 is scanned in the first scanning SC1, and thereafter the second scanning SC2 of scanning a second area A2 adjacent to the first area A1 along a sub-scanning direction X (a direction parallel with the long-axis direction of the modulated beam L33) is performed. In this case, in the second scanning SC2, the edge portion of the modulated beam L33 is superposed on the edge portion of the first area A1 along the sub-scanning direction X. As a result, the modulated beam L33 is repetitively radiated to an edge area A11 by the first scanning SC1 and the second scanning SC2.

Further, the control unit 15 controls the spatial light modulator 22 such that the total energy amount of laser light radiated to the edge area A11 is equal to the total energy amount of light radiated to an area adjacent to the edge area A11. For example, as shown in FIG. 6, the intensity distributions D1 and D2 of the modulated beam L33 in the scanning SC1 and SC2 are adjusted. More specifically, the intensity of a portion other than the edge area A11 in the intensity distributions D1 and D2 is set to the maximum intensity $I_{Max}$. Further, the intensity of the edge area A11 in the intensity distribution D1 and the intensity of the edge area A11 in the intensity distribution D2 are respectively adjusted to values, a sum of which is equal to the maximum intensity $I_{Max}$.

Further, in order to adjust the intensity of laser light radiated to the edge area A11, a width W of the edge area A11 (a length along the sub-scanning direction X) is set to a width corresponding to one of N modulation components 224 of the spatial light modulator 22. That is, the scanning unit 13 repetitively scans a portion corresponding to one of the plurality of modulation components 224, to scan the edge area A11 twice. Note that the width W of the edge area A11 (the length along the sub-scanning direction X) may be a width corresponding to two or more of N modulation components 224 of the spatial light modulator 22.

By the above-described adjustment of the intensity distributions D1 and D2, the sum of the intensity distributions D1 and D2, in other words, the total energy amount (intensity distribution D3 indicated by a broken line in FIG. 6), can be made equal to the maximum intensity between the first area A1, the second area A2 and the border therebetween (the edge area A11). Therefore, it is possible to prevent occurrence of uneven processing and uneven coloring caused due to uneven processing in the edge area A11.

The reflection surface of the LPLV is subjected to Al vapor deposition, for example. In projecting the reflection surface of the LPLV onto an imaging surface, with a magnification equal to or higher than a unity magnification, it is difficult to obtain an energy density required to mark the object 9. Meanwhile, the surface of the LPLV is formed of metal (Al), and hence has fluence approximately equal to that of a metal in the surface of the object 9 to be marked, in some cases. In such a case, to process the object 9 may possibly result in processing of also the surface of the LPLV. In order to avoid such processing of the LPLV, it is preferable that the projection optical system 23 is a reduction optical system configured to reduce the modulated beam L33. Specifically, it is preferable that the reduction scaling factor of the projection optical system 23 is set such that the fluence of the surface of the LPLV is equal to or smaller than ⅕ of the fluence of the object 9. By adopting a reduction optical system as the projection optical system 23, it is possible to make the energy density of laser light (the parallel beam L32) radiated to the spatial light modulator 22 smaller than the energy density of laser light (the modulated beam L33) radiated to the object 9. Thus, the surface of the spatial light modulator 22 can be prevented from being processed by the laser light. Note that the scaling factors of the projection optical system 23 for the long-axis direction and the short-axis direction may be equal to each other or different from each other.

While the invention has been shown and described in detail, the foregoing description is in all aspects illustrative and not restrictive. It is therefore understood that numerous modifications and variations can be devised without departing from the scope of the invention.

What is claimed is:

1. A laser marker that radiates laser light to an object including a metal surface, to form a mark, comprising:
  - a laser light source configured to emit the laser light;
  - a collimating lens configured to shape the laser light into a line-shaped parallel beam;
  - a planar light valve (PLV) including a plurality of modulation components arranged along a long-axis direction, each of the plurality of modulation components being capable of multilevel control of a light amount, and the PLV being configured to spatially modulate the parallel beam into a line-shaped modulated beam by switching reflected light from the plurality of modulation components between zeroth-order light and non-zeroth order light;

a plurality of optical elements including a plurality of lenses configured to guide the modulated beam to the object;

a scanning unit configured to scan the surface of the object with the modulated beam; and one or more processors configured to control the PLV and the scanning unit, wherein the one or more processors are configured to:

cause the scanning unit to scan a second area adjacent to a first area that is to be scanned earlier such that an edge portion of the modulated beam is superposed on an edge portion of the first area; and control the PLV such that a total energy amount of the laser light radiated to the edge portion of the first area in scanning of the first area and scanning of the second area is equal to a total energy amount of light radiated to an area adjacent to the edge portion of the first area.

2. The laser marker according to claim 1, wherein the edge portion of the first area has a width corresponding to at least one of the plurality of modulation components.

3. The laser marker according to claim 1, wherein the plurality of optical elements including the plurality of lenses is a reduction optical system configured to reduce an image of the modulated beam.

* * * * *